United States Patent [19]

Tukala et al.

[11] Patent Number: 5,622,461
[45] Date of Patent: Apr. 22, 1997

[54] DRILL AND CUTTING INSERT THEREFOR

[75] Inventors: Tommy Tukala; Åke Sjölander, both of Sandviken, Sweden

[73] Assignee: Sandvik AB, Sandviken, Sweden

[21] Appl. No.: 437,307

[22] Filed: May 9, 1995

[30] Foreign Application Priority Data

May 9, 1994 [SE] Sweden ................................ 9401598

[51] Int. Cl.⁶ .................................................. B23B 51/00
[52] U.S. Cl. .......................... 408/224; 407/113; 408/233; 408/713
[58] Field of Search .................................. 408/223, 224, 408/227, 231–233, 713; 407/40, 42, 47, 113, 114

[56] References Cited

U.S. PATENT DOCUMENTS

| | | |
|---|---|---|
| 4,648,760 | 3/1987 | Karlsson et al. ...................... 408/188 |
| 4,889,455 | 12/1989 | Karlsson et al. ...................... 408/224 |
| 5,354,156 | 10/1994 | Von Haas et al. ..................... 408/223 |

FOREIGN PATENT DOCUMENTS 2730418  1/1979  Germany.

*Primary Examiner*—Steven C. Bishop
*Attorney, Agent, or Firm*—Burns, Doane, Swecker & Mathis, L.L.P.

[57] ABSTRACT

A drill for drilling in metal with improved performance in the smaller diameter range. The drill comprises a drill shaft, the front end of which is provided with radially outer and radially inner inserts, each insert having elongated rhomboidic shape, in which each of the short sides is broken at its middle to form a V-shape having an internal obtuse angle. The inserts are arranged such that the longitudinal axis of the radially outer insert is inclined at an angle from the longitudinal axis that is different from the angle of inclination between the longitudinal axis of the radially inner insert and the longitudinal axis of the drill.

6 Claims, 3 Drawing Sheets

Fig. 1
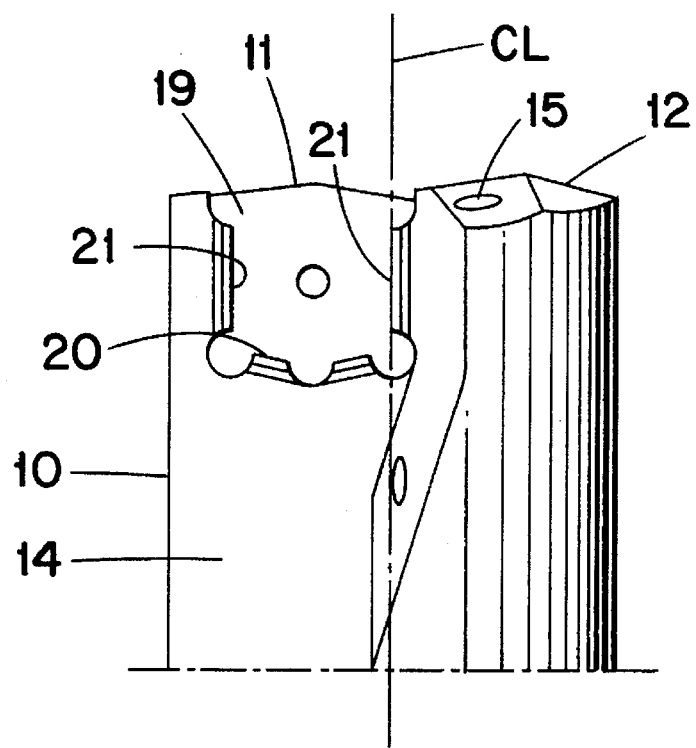
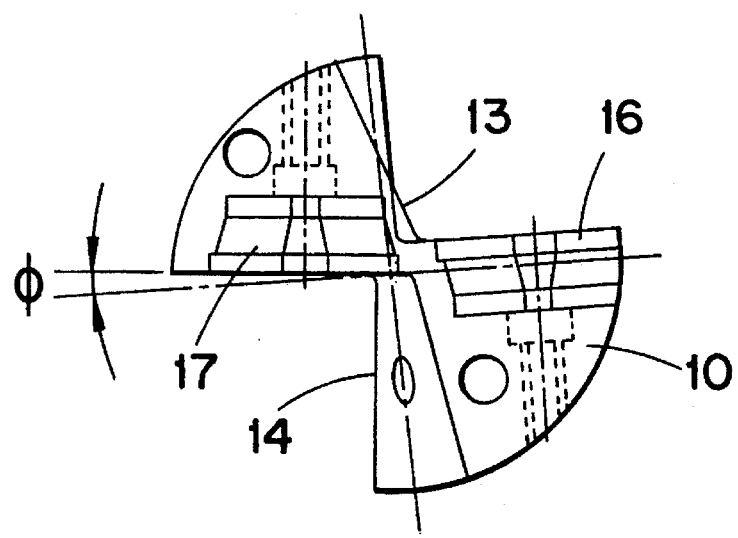
Fig. 2

DRILL AND CUTTING INSERT THEREFOR

BACKGROUND OF THE INVENTION

The present invention relates to a drill for the drilling of preferably metallic work pieces and a cutting insert for use in this drill.

A known drill comprises a drill shank having at least two generally axial chip flutes formed therein and at least two cutting insert sites to receive identical cutting inserts. The active cutting edge of one cutting insert projects sidewardly such that the diameter of the bore is determined thereby during a flow of chips through one chip flute. The active cutting edge of the other cutting insert is arranged radially inside the outer periphery of the drill shank and cuts chips which flow through the other chip flute.

German Patent 2730418 discloses a drill equipped with two 6-cornered inserts of mutually identical shaping received in two cutting insert sites. Each corner is formed by two edges that are mutually angled such that the bisector of each pair of edges extends parallel with the central axis of the drill.

Another type of drill is disclosed in U.S. Pat. No. 4,648,760. The inserts of this drill have a mainly rectangular shaping where each end surface of the drill is confined by two cutting edges that intersect at an obtuse angle and wherein the radially outer insert of the drill is inclined such that the size of the hole to be drilled is defined thereby, whereas the longitudinal axis of the radially inner insert extends parallel with the central axis of the drill while overlapping the same.

With drills of the aforesaid type it is difficult to achieve holes with small diameters. Further, it is difficult to use such drills for stack drilling, i.e., drilling of a plurality of plates at the same time. During such type of stack drilling there is usually formed a breakout slug. The slug will rotate with the drill and at large feed force there is a risk for cutting edge and/or drill breakdown.

The object of the present invention is to solve the above-mentioned problems.

SUMMARY OF THE INVENTION

The invention relates to a drill comprising a drill shank and at least two radially inner and outer polygonal cutting inserts mounted therein. The drill shank has at least two generally axial chip flutes and at least two cutting insert sites receiving the outer and inner cutting inserts, respectively. The cutting inserts are of identical shape. An active cutting edge of the outer insert projects laterally outwardly to define a diameter of a bore to be cut. An active cutting edge of the inner cutting insert is arranged radially inside of an outer periphery of the drill shank. Each insert includes side faces interconnected by end faces. Each of the active cutting edges of the inserts is defined by an intersection of one of the side faces and one of the end faces. Each of those side faces is broken in the middle (i.e., is non-linear) so that each cutting edge forms an internal obtuse first angle at the break. A longitudinal axis of the radially outer insert is inclined at a second angle in relation to longitudinal axis of the drill as viewed in a radial direction perpendicular to the active cutting edge of the outer insert. Each insert has a rhombic basic shape and arranged such that the second angle is smaller than a third angle of inclination formed between a longitudinal axis of the radially inner insert relative to the drill axis.

The present invention also relates to a cutting insert for a drill. The insert comprises a generally polygonal shape having parallel first and second side surfaces interconnected by a pair of long end surfaces, and a pair of short end surfaces. The first face is smaller than the second face. Cutting edges are formed by intersections of the second side surface and the short end surfaces. The short surfaces are broken in the middle (i.e., are non-linear) so that each cutting edge forms an internal obtuse angle at the break. A shortest distance between the long surfaces is shorter than a distance between the ends of each cutting edge. Each insert has a rhombic basic shape, with ends of the short end surfaces being rounded off to form nose portions. A distance between the nose portions of each cutting edge defines a largest width of the insert.

BRIEF DESCRIPTION OF THE DRAWINGS

The invention will be more closely described below in connection with the following drawings which show a preferred embodiment of the invention:

FIG. 1 shows a side view of the forward cutting portion of a drill shank according to the invention, with no cutting inserts attached.

FIG. 2 shows a top or end view of the drill shown in FIG. 1.

DETAILED DESCRIPTION OF A PREFERRED EMBODIMENT OF THE INVENTION

Figure 3:
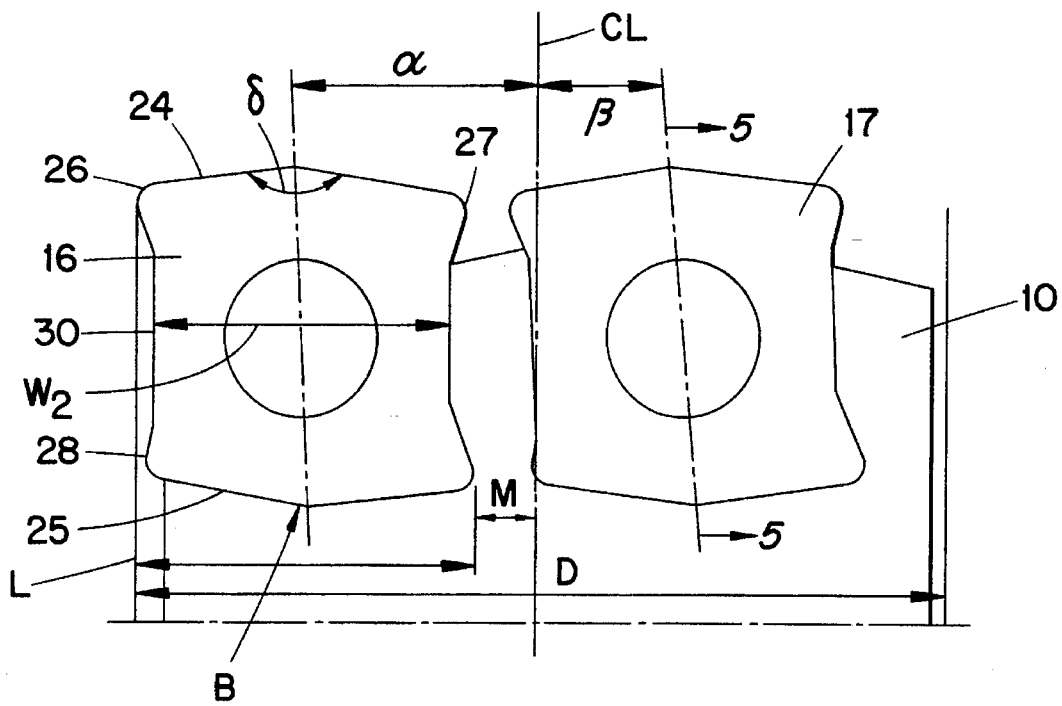
FIG. 3 is an enlarged view of a portion of the drill shown in FIG. 1, with the cutting inserts installed.
Figure 4:
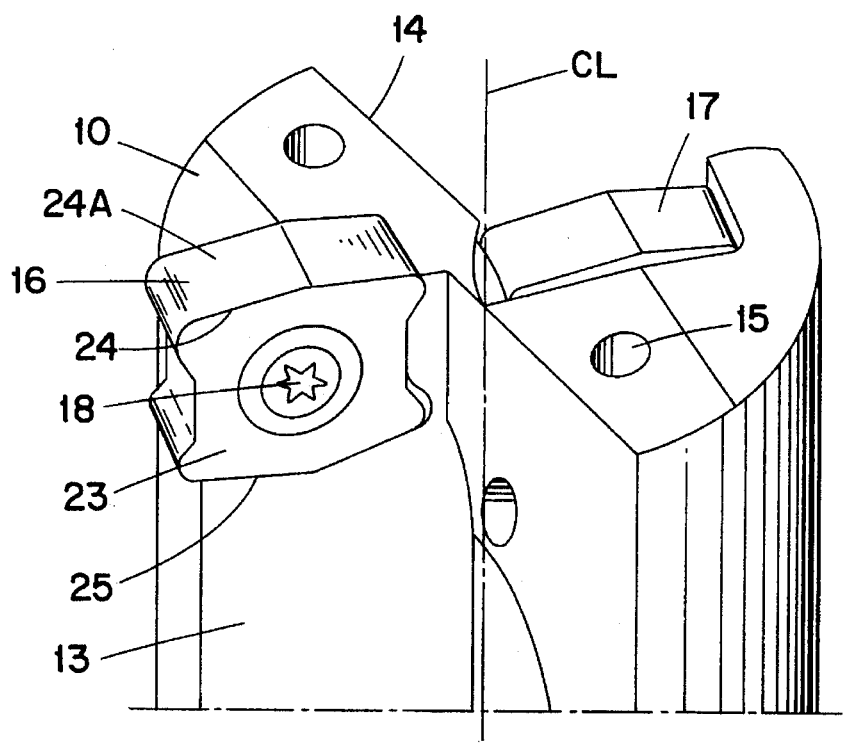
FIG. 4 is a perspective view of the drill shown in FIGS. 1–3.
Figure 5:
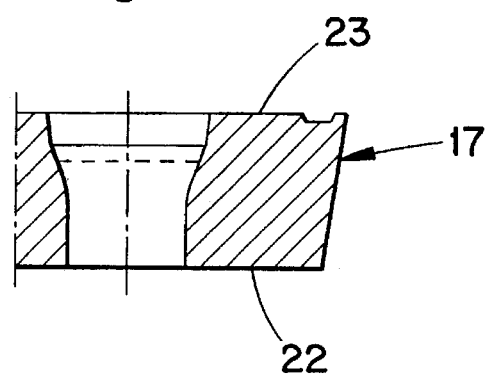
FIG. 5 is a sectional view taken along the line 5—5 in FIG. 3.

FIGS. 1–4 show a portion of a cylindrical drill shank 10 which at its most forward part is provided with two cutting insert sites 11 and 12, positioned on opposite sides of the center line CL of the drill. Axial flutes or passages 13, 14 for the flow of chips extend to said insert sites. These axial flutes can be straight or helical. The drill shank 10 also includes channels 15 for submitting cooling medium to the front cutting end portion of the drill. Both of the cutting insert sites 11 and 12 are centrally provided with holes to receive threaded lock screws 18 for the locking of centrally apertured cutting inserts 16, 17 in the sites. The sites comprise a central site 11 arranged radially inside the outer periphery of the drill shank 10, and a peripheral site 12 which terminates in the periphery of the drill shank. The cutting insert sites 11 and 12 are shaped in the drill shank 10 such that they exhibit different axial clearance angles and together achieve drilling of the complete diameter of the hole being drilled.

The radially outer insert 16 is inclined at a certain angle such that the diameter of the drilled hole is defined thereby.

There is a core portion M of the drill shank provided between said inner and outer inserts 16, 17 of such width that sufficient strength of the drill is achieved. The dimension of the drill is defined by a diameter D, wherein D/2 equals the distance between the center axis CL and a longitudinal line L extending from a radially outermost portion of the outer insert 16. Each cutting insert site comprises a tangential support surface 19, an axial support surface 20 and a radial support surface 21.

Each insert has an elongated polygonal shape, i.e., a rhomboidic shape comprising an upper face 23 and a lower face 22 which are mainly parallel with each other. The faces 22, 23 are joined by two opposite end faces (end face 24A being shown in FIG. 4) which correspond to short sides of a basic rectangle. The lower face 22 is of smaller area than the upper face 23 and therefore the cutting insert achieves a positive clearance angle. The intersection lines of said short sides with the upper face 23 form two main cutting edges 24, 25, where each of these edges is broken or bent at its middle (i.e. each edge is non-linear) and forms a V with an internal obtuse angle δ. Only one of the cutting edges 24, 25 cuts the workpiece during each drilling operation. Each of these edges is rounded off at parts forming first and second nose portions 26, 27 and first and second nose portions 29 and 28 between which the largest width $W_1$ of the insert is defined (see FIG. 6). The shortest distance between the long side surfaces of the insert is defined by $W_2$.

As appears from FIG. 3, both inserts 16 and 17 are rhomboidic in shape and are oriented at a certain inclined angle with respect to the longitudinal axis (CL) of the drill. The centrally located insert 17 projects axially a certain distance in front of the peripheral insert 16 in order to ensure that the radial forces are more favorably directed so that the desired diameter is achieved. The outer insert 16 is inclined at an angle α (see FIG. 3) and the inner insert 17 is inclined at an angle β in relation to the longitudinal axis CL of the drill. The angle α is smaller than the angle β in drills for solid drilling. The angle β should preferably amount to a value of 4°–8° whereas the angle α should have a value in the range 1°–3°. In drills for stack drilling for making a hole in a number of plates, the angle α should be somewhat larger than the angle β because in this type of drilling, there is usually formed a breakout slug which requires a larger degree of overlap between the inserts.

Figure 6:
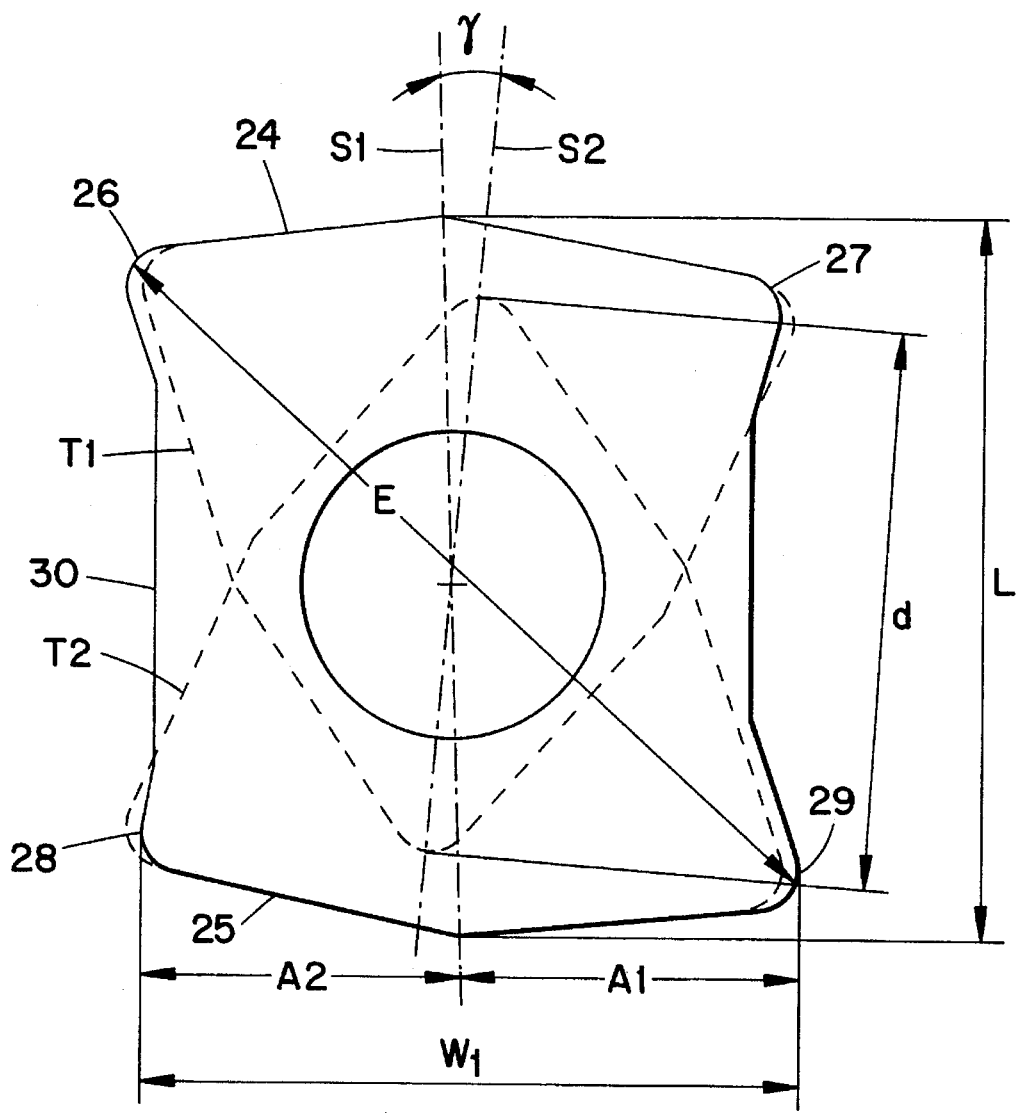
FIG. 6 is an enlarged side view of a cutting insert as shown with the drill in FIGS. 3–4.

In FIG. 6 the rhomboidic shape of the insert 16, 17 is shown in more detail. A straight side surface 30 extends longitudinally between the nose portions 26 and 28. The radius of diagonally opposed nose portions 26 and 29 is somewhat larger than the radius of the other pair of diagonally opposed nose portions 27 and 28. In similarity with the insert disclosed in U.S. Pat. No. 4,648,760 this insert could be viewed as being composed of two partially overlapping triangles T1 and T2 (shown in phantom in FIG. 6) wherein each side surface of said triangle is broken or bent in the middle (i.e., is non-linear) so that each cutting edge forms an obtuse angle at the break. However, the insert has a configuration such that the nose portions 26 and 27 do not fully coincide with the contour of the nose portions of the projected surface of the triangle. The side surface located between two adjacent nose portions coincides with the edge 24 of said projected triangle, but the ends forming rounded off nose portions 28 and 29 are laterally displaced from the projected surface of its associated triangle T2 in one direction whereas the opposite pair of rounded off nose portions 26 and 27 are similarly laterally displaced in the opposite direction from the nose portions of their associated triangle T1.

The third corner portions of the triangles are arranged relatively centrally in the cutting insert at a distance $\underline{d}$ from each other. This distance is shorter than the entire length L of the insert such that $\underline{d}$ becomes 0.5 to 0.9 preferably 0.7 to 0.9, times the length L.

As appears from FIG. 6 the lower nose portion 28, to the left, is located at a certain distance laterally inside the lowermost left corner of the triangle T2 whereas the lower nose portion 29, to the right, is located at a certain distance laterally outside the lowermost right corner of same triangle T2. This configuration of the insert is achieved due to the fact that a bisector S1 drawn through the opposite obtuse-angled corners of triangles T1 and T2 forms an angle with the bisector S2 drawn through the centrally located corners between which distance $\underline{d}$ is defined. The size of the angle γ should preferably be selected to be in the range of 2° to 6°.

From the foregoing, it will be appreciated that the first nose portion 29 of the cutting edge 25 is spaced by a first distance A1 from the break B of its respective cutting edge 25. The second nose portion 28 of that same cutting edge 25 is spaced by a second distance A2 from the break B. The first distance A1 is larger than the second distance A2. That is also true of the first and second nose portions 26, 27 of the other cutting edge 24. The first nose portions 26 and 29 are spaced apart diagonally, i.e., along a diagonal E of the insert.

In addition thereto the drill is preferably designed such that the radially inner insert 17 has such a radial orientation that it becomes located offset from a 180 degree relationship with the radially outer insert 16 by an angle φ (see FIG. 1) wherein φ is of such magnitude that the drill is radially balanced against the radial cutting forces acting on the drill shaft 10. Usually, the angle φ is in the range of 5°–7°.

By having provided a drill with insert having a rhomboidic shape it has become possible to reduce the diameter of the drill without negatively affecting the thickness of the core portion M since this shape of the insert will enable the insert to appear at a certain inclination from the longitudinal axis of the drill. With a drill such as defined and described in U.S. Pat. No. 4,648,760 a drilling diameter range of 17.5 to 26 mm could be used whereas a drill such as defined in this application will enable successful usage of drills having a diameter in the range of 12.7 to 26 mm.

What is claimed is:

1. A drill comprising a drill shank and at least two radially inner and outer polygonal cutting inserts mounted thereon; the drill shank having at least two generally axial chip flutes and at least two cutting insert sites receiving the outer and inner cutting inserts, respectively; the cutting inserts being of identical shape; an active cutting edge of the outer insert projecting laterally outwardly to define a diameter of a bore to be cut; an active cutting edge of the inner cutting insert arranged radially inside of an outer periphery of the drill shank; each insert including side faces interconnected by end faces; each of the active cutting edges of the inserts being defined by an intersection of one or the side faces and one of the end faces; each of those side faces being broken in the middle so that each cutting edge forms an internal obtuse first angle at the break; a longitudinal axis of the radially outer insert being inclined at an acute second angle in relation to the longitudinal axis of the drill as viewed in a radial direction perpendicular to the active cutting edge of the outer insert; each insert having a rhombic basic shape and arranged such that the second angle is smaller than an acute third angle of inclination formed between a longitudinal axis of the radially inner insert relative to the drill axis.

2. The drill according to claim 1, wherein the third angle is in the range of 4°–8°.

3. The drill according to claim 1, wherein the radially inner insert projects axially forwardly beyond the radially outer insert.

4. The drill according to claim 1, wherein both ends of each cutting edge are rounded off to form first and second nose portions, the first and second nose portions being spaced from the break of a respective cutting edge by first and second distances, respectively, the first distance being greater than the second distance, the first nose portions being spaced diagonally apart from one another on the insert.

5. A cutting insert for a drill comprising a generally polygonal shape having parallel first and second side surfaces interconnected by a pair of first end surfaces and a pair of second end surfaces, the first side surface being smaller than the second side surface; cutting edges being formed by intersections of the second side surface and the second end surfaces; the second end surfaces being broken in the middle so that each cutting edge forms an internal obtuse angle at the break; each insert having a rhombic basic shape, with both ends of each of the second end surfaces being rounded off to form first and second nose portions; the first and second nose portions being spaced from the break of a respective cutting edge by first and second distances, respectively, the first distance being greater than the second distance, the first nose portions being spaced diagonally apart from one another on the insert.

6. The insert according to claim 5, wherein each of the first nose portions has a radius of curvature larger than that of the second nose portions.

* * * * *